Nov. 24, 1970  S. M. COLE  3,541,698
RECORD CARD ASSEMBLY FOR TEACHING MACHINES
Filed Nov. 21, 1968

INVENTOR
SAM M. COLE by: Bair, Freeman & Molinare
ATTYS.

3,541,698
RECORD CARD ASSEMBLY FOR TEACHING MACHINES
Sam M. Cole, New York, N.Y., assignor to Meredith Corporation, Des Moines, Iowa, a corporation of Iowa
Filed Nov. 21, 1968, Ser. No. 777,795
Int. Cl. G09b 1/06
U.S. Cl. 35—8                                             4 Claims

ABSTRACT OF THE DISCLOSURE

Program cards for teaching machines which are sandwiched or laminated between webs of transparent plastic film with their adjacent edges in parallel spaced relation. The plastic film between the spaced cards serves as a hinge to permit stacking the cards accordion-fashion into a deck which is placed on the card holder of the machine. Each card carries instructional information and coding perforations, the latter being covered by the plastic film. The film overlying the perforations may be perforated or covered with opaque paint, depending upon the construction of the control means of the teaching machine, to program the sequence of instructional operations and the feeding of the cards from the deck to viewing position and back to the deck.

---

This invention relates to an educational device, namely, an assembly of program cards for teaching language or imparting other intelligence to a student. More particularly, the invention relates to a card construction for a self-teaching machine in which a series of interconnected cards are presented individually to the student in a predetermined sequence controlled by a code carried on the card. The student views the card and makes a response to what he sees (or hears) thereby actuating the machine to advance and present a new card, to reverse and present an old card for reteaching, to dispense a reward, to ring a buzzer, or to perform some other function in the teaching process.

Each card consists of a blank made from heavy paper, plastic, or the like, having a plurality of defined areas on the surface thereof, one of said areas containing a reference or sample indicia and the other areas containing multiple choice indicia, including a correct choice which matches the sample. Coding, which takes the form of holes or punched out areas that cooperate with sensing devices in the machine may signal the machine with respect to correct choice, standby choice, skipping cards either in the forward or reverse direction, controlling relays for auxiliary equipment and the like.

The machine is equipped with a card holder to transport the cards in either direction to a display area and also includes a power supply and a logic package to control machine operation sequences. Depending upon the coded data on the card, the student's response and a corresponding printed circuit pattern inserted into the logic package, certain modes of presentation and reinforcement contingencies will be set up by the machine. The machine itself, however, is not part of the invention disclosed and claimed herein.

The cards are supplied to authors and researchers in blank with printed borders for art work and prepunched positions for coding data. The programmer can quickly place visual presentations on the cards for a particular educational program and immediately test them individually or in sequence. When the program has been completed, the cards are secured together in hinged, spaced relationship. It has been proposed heretofore to tape the cards together at their edges with two or more strips of adhesive tape bridging the space between the cards. This strip means of hinging is not satisfactory because it does not maintain the cards in accurately spaced relation, i.e. separated a fixed distance with the edges parallel. The spacing must be uniform and the cards must be parallel to feed properly into the viewing area of the teaching machine. It has also been proposed to score a continuous length of heavy paper into hinged cards, but the cards thus formed are not spaced one from the other and the paper is not sufficiently durable to serve as a hinge under the conditions of use.

I have discovered that individual program cards can be laminated between two continuous webs of transparent plastic film in accurately spaced relation to provide an accordion-folded deck. The plastic film is heat sealed to the front and back surfaces of the card to protect it against moisture, dirt, grease, or the like. Between adjacent cards the front and back films weld together to form a plastic hinge which is durable and of predetermined width so that the cards can be handled efficiently by the card holder on the teaching machine. Other advantages of the invention will become apparent from the description of a preferred embodiment shown in the accompanying drawings wherein FIG. 1 is a plan view of a series of interconnected cards in flattened, extended position;

The present invention is best utilized in a program based upon the technique of "matching to sample." In accordance with the invention, the student views a picture or like indicia in a block-like display area to one side, usually the left side on a program card and then selects a matching picture or like indicia from a number of choices (usually three) which are presented to him. The student may be presented with a variety of combinations of visual and audio material for each program card. In a preferred form of the invention, each card or frame of a program of instruction has four visual areas consisting of a sample and three alternatives. An audio presentation may be presented in conjunction with each visual area. Audio need not be recorded in conjunction with every visual area. A number of combinations are possible; the sample and the alternatives may all carry a visual presentation only, an audio presentation only, or a combination of audio plus visual presentation; the sample may carry a combination of visual plus audio and the alternatives audio only; the sample may carry visual plus audio and the alternatives visual only. Actuation of the audio portion of the machine is controlled by the coding data punched on the card.

Figure 1:
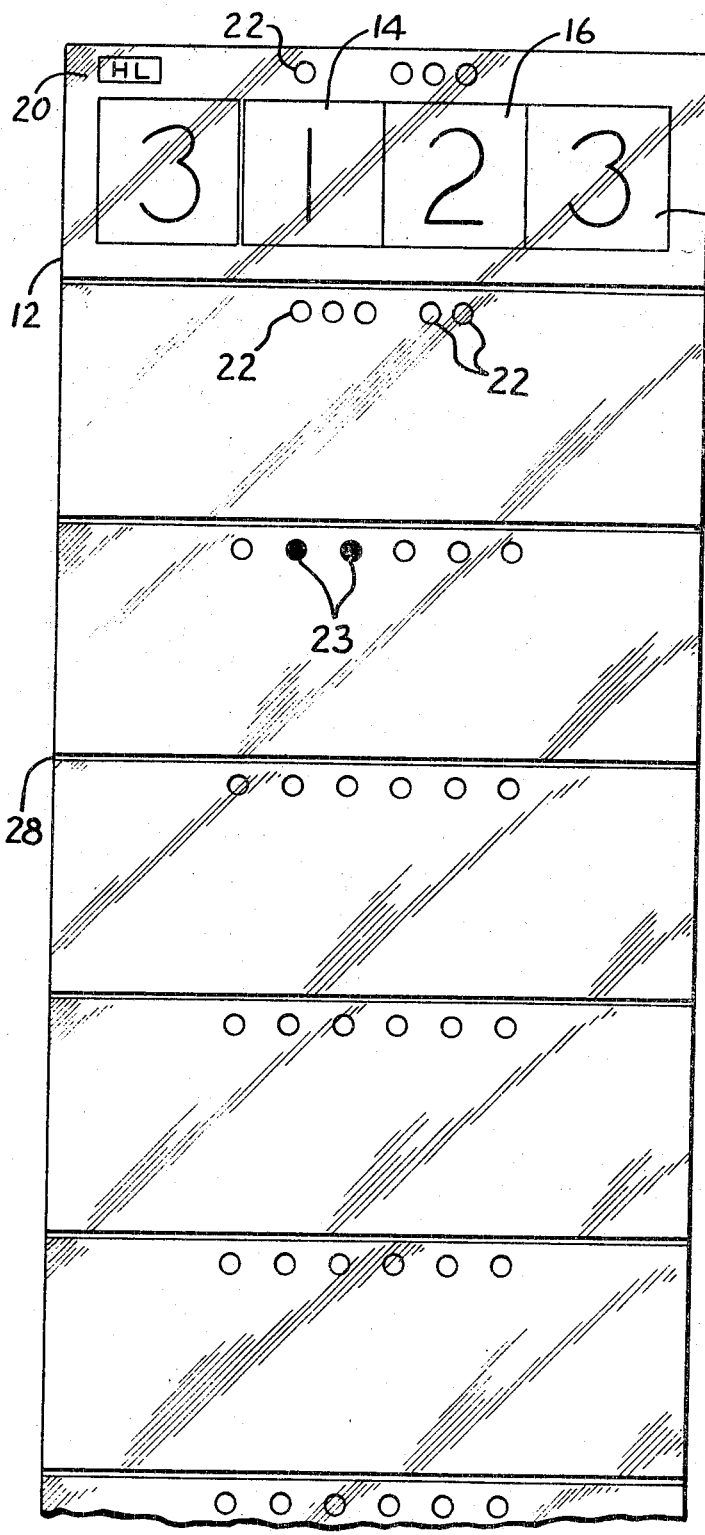

Referring to the drawings, the program card 10 comprises a substantially rectangular body formed of a flat sheet of paper, plastic, or like material. A convenient size for the cards is 3¼" x 9" x .020". The surface of the card should be able to take print from pencil or a reproduction machine and should be self-supporting. On the front of the card is printed matter coordinated in a particular manner in order to obtain the desired instructional results. To the left as viewed in FIG. 1, there is a sample block or area 12. Appearing in the block 12 may be a letter or number as shown, a word, a picture, or other visual symbol.

Appearing on the card 10 to the right of the sample or reference indicia, are a plurality of choice blocks or areas. Preferably there are three choice blocks 14, 16, and 18 longitudinally lined with the sample block. One choice block contains indicia that corresponds with that in the sample block and is designated the "correct choice." The indicia in the other choice blocks is different from that in the sample block, "wrong choice." The matching choice block, in the illustrated embodiment of the invention of block 18, may contain identical indicia, for example, the numeral "3," or corresponding indicia such as the word "three," or a representation of three objects.

Although the choice blocks are aligned longitudinally opposite the sample block, the card need not be confined to this particular arrangement. For example, the sample block may be centrally located and the choice blocks spaced uniformly around the sample block. This would necessitate changing the general shape of the card.

Identification means indicated generally at 20 may be provided on the card to enable the programmer to identify the card and permit arrangement of a group of cards in a desired order prior to laminating. Each card also contains coding means which may control the operation of magnetic tape playback response devices, indicator signals, and control relays for auxiliary equipment. In the example shown in FIG. 1, the coding means consists of openings or apertures 22 which vary in number and space relationship from card to card. In other words, the blanks have no coding apertures, the latter being punched during programming. The openings 22 are adapted to cooperate with a selection mechanism on the teaching machine to indicate selection of a correct answer by the student and cause the next operation in the sequence to be performed. After laminating, all of the apertures in every card must be punched out.

The blank cards alternatively may be prepared each with identical coding perforations properly placed and in sufficient number to match any of the sensing operations capable of being performed by the machine. These openings are covered over by the plastic film when the cards are laminated and may be selectively punched out to make the card correspond to the particular function the machine is to perform. For example, by punching out one of the perforations, the program may be initiated in one of a number of ways. The location of the perforation may signal the machine to initiate the sample automatically, or from other stimuli such as lights, sounds, or to repeat a sample if no stimuli is recorded by the student within a settable time delay. By punching out other perforations, the card may be coded for wrong choice programming whereby a buzzer or light is actuated or the machine may be caused to back up for reteaching. Other coding includes perforation for right choice programming. For example, the machine may be actuated to advance a new card, ring a bell, or dispense a reward, skip a card if the previous answer was correct, skip one card if the previous two answers were correct, stop a timer, or the like.

After the blank cards have been properly programmed with the correct information applied, they are laminated together between sheets of transparent plastic in the desired sequence. One web of plastic 24 is heat-sealed to the front of the cards and the other sheet 26 is heat-sealed to the back of the cards. The webs 24 and 26 are supplied in rolls of continuous length and they weld together as indicated at 28 to form a hinge between the cards. The plastic film may be a thermoplastic resin such as polyester (Mylar) or polypropylene which welds together inseparably to form a tough transparent coating that will not crack, chip, peel, or delaminate. The resin film serves as the bonding agent and under heat and pressure softens and fills the pores of the paper. The paper and film become one, insuring lasting protection. The film may range in thickness from .0015" to .015".

The laminating process can be carried out continuously using a commercially available laminating machine having a pair of heated rolls through which the cards are fed between the continuous webs of plastic film. The rolls are maintained at a temperature above the softening point of the particular thermoplastic resin film being used, and cooling takes place immediately upon emergence of the laminated product from the machine.

The cards are placed in a stack on a feed table and are advanced into the laminating machine by chain links of a conveyor. The spacing of the cards and thus the width of the hinge can be changed by varying the speed of the conveyer. Preferably, the distance is about $\frac{1}{16}$". This spacing must be accurate if the cards are to feed properly into the viewer of the teaching machine.

Figure 2:
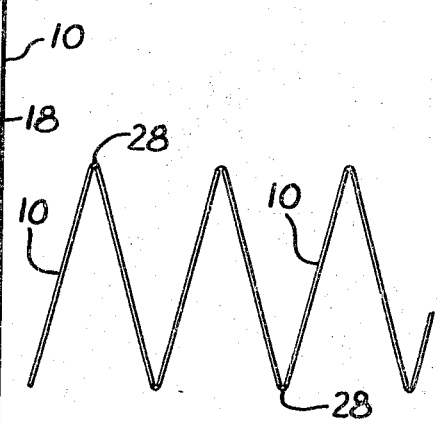
FIG. 2 is an end view of the series of cards shown in FIG. 1.
Figure 3:
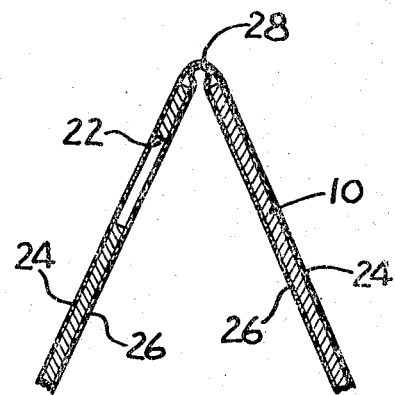
FIG. 3 is an enlarged view of two cards of the deck showing in more detail the plastic film covering and the hinge between the adjacent edges of the cards.

The laminated cards are stacked in accordian fashion as shown in FIG. 2 to form a deck which is placed in the teaching machine. The card holder on the machine is adapted to move the cards one at a time from the deck into viewing position. Because the cards are hinged together in the proper order, they cannot become mixed up or lost if they are dropped, and the plastic film makes them much more durable than they would otherwise be. A particular advantage is that the plastic prevents moisture absorption by the paper and attendant warping which causes the cards to jam in the teaching machine.

During laminating, the coding perforations 22 are covered over by the film 24, 26, as indicated at 23, and if the machine is of the type which is actuated by physical contact through the holes, the film is punched out of the particular holes which control the desired operation. Alternatively, the machine may operate by light passing through predetermined openings in which case all of the openings which are not to function may be painted over with India ink or suitable opaque paint which adheres to the plastic. Thus, the machine senses the presence or absence of the hole (light) and sends a signal to the logic module of the machine. This module compares the signal received from the code element, from the response devices, and from the machine operations. Form this comparison, the logic system will set up a pattern of operation and generate signals to the various operating devices.

If desired, the cards may be laminated before programming. In such case all cards are identical, with a sufficient number of plastic-covered perforations to match each sensing device in the teaching machine. The programmer applies the reference and choice indicia directly to the plastic surface and punches out the web overlying those perforations which will provide the preselected coding. Or if the functions are controlled by a light beam, the non-selected perforations are covered with an opaque coating.

What is claimed is:
1. An assembly of record cards for instruction purposes comprising individual cards carrying
    (a) visual reference indicia and a matching indicia so as to provide for multiple choice selection of an answer corresponding to said reference indicia
    (b) perforations for coding the card to control the mode of presentation of the instructional indicia
said cards being aligned and laminated between opposed webs of transparent plastic film with adjacent edges thereof in spaced parallel relation, said webs covering said perforations and being joined together at the spaces between the cards to provide hinges to permit stacking the cards accordian fashion into a deck and feeding said cards seriatim from the deck into the teaching machine.
2. The assembly of claim 1 in which the webs overlying selected perforations are punched out to effect the desired coding.
3. The assembly of claim 1 in which the webs overlying selected perforations are covered with opaque coating to effect the desired coding.

4. The assembly of claim 1 in which the plastic film is polyester resin.

References Cited
UNITED STATES PATENTS

| | | | |
|---|---|---|---|
| 3,195,242 | 7/1965 | Ward et al. | 35—9 |
| 3,212,199 | 10/1965 | Clark | 35—9 |
| 3,363,330 | 1/1968 | Kobler | 35—9 |
| 3,422,547 | 1/1969 | Heine | 35—9 |

WILLIAM H. GRIEB, Primary Examiner

U.S. Cl. X.R.

40—102